United States Patent [19]

Goodrich

[11] 4,351,384
[45] Sep. 28, 1982

[54] COOLANT CONTROL IN EM CASTING
[75] Inventor: David G. Goodrich, Danville, Calif.
[73] Assignee: Kaiser Aluminum & Chemical Corporation, Oakland, Calif.
[21] Appl. No.: 78,338
[22] Filed: Sep. 24, 1979
[51] Int. Cl.³ .............................................. B22D 27/02
[52] U.S. Cl. ..................................... 164/468; 164/504
[58] Field of Search ................. 164/89, 443, 444, 348, 164/126, 128, 49, 147

[56] References Cited
U.S. PATENT DOCUMENTS

| | | | |
|---|---|---|---|
| 3,623,536 | 11/1971 | Moritz | 164/89 |
| 3,713,479 | 1/1973 | Bryson | 164/444 X |
| 3,985,179 | 10/1976 | Goodrich et al. | 164/49 |
| 4,158,379 | 6/1979 | Yarwood et al. | 164/89 |

FOREIGN PATENT DOCUMENTS 735809  8/1955  United Kingdom ................. 164/89

Primary Examiner—R. L. Spruill
Assistant Examiner—K. Y. Lin
Attorney, Agent, or Firm—Paul E. Calrow; Edward J. Lynch

[57] ABSTRACT

The invention relates to the application of coolant onto the surface of an electromagnetic D.C. cast ingot or billet where two coolant streams are directed to the solidified or partially solidified metal so that the two streams intersect a short distance away from the metal surface. By controlling the velocity and/or volume of one or both coolant streams, the point of impact on the metal surface can be brought closer to the discharge end of the inductor and thereby increase cooling rates. In this manner the excursions of molten metal which form the icicle-like appendages on EM cast ingot or billet can be effectively eliminated. When the end of the ingot or billet passes the area of coolant impact and the risk of such excursions is slight, the point of coolant impact can be lowered to a more conventional level for the remainder of the cast.

1 Claim, 4 Drawing Figures

COOLANT CONTROL IN EM CASTING

BACKGROUND OF THE INVENTION

This invention generally relates to the direct chill (DC) casting of light metal products such as aluminum and aluminum alloys in an electromagnetic (EM) field.

In brief, the DC casting process comprises introducing molten metal into the feed end of the open ended passageway of a tubular shaped mold, solidifying or partially solidifying the molten metal as it travels through the pasageway and applying coolant to the surface of the solidified or partially solidified metal as it emerges from the discharge end of the open ended passageway. At the start of the cast a bottom block or other device is disposed at the discharge end of the mold to block off the passageway, and, when the mold passageway is full of molten metal and the metal therein is sufficiently solidified to support itself, the bottom block is gradually withdrawn from the discharge end. Although coolant is applied to the backside of the mold body to cool the molding surfaces thereof and to thereby initiate the solidification of molten metal within the mold bore, most of the solidification is effected by the application of coolant onto the surface of the cast metal as it emerges from the discharge end of the mold. This is due to the fact that, when the molten metal contacts the water cooled, chill surfaces of the mold bore, it forms an initial shell or embryo and the metal stream then contracts and pulls away from the mold surfaces as solidification proceeds. Once contact with the metal stream is lost, very little heat transfer is effected through the mold walls.

In conventional DC casting a curtain of coolant is applied completely around the periphery of the emerging metal and generally at an angle of about 5° to 30° from the metal surface and in the direction of metal movement. The coolant is applied at a shallow angle to minimize the splashing of coolant from the metal surface which can disrupt the transfer of heat and have a detrimental result on the solidification rate.

Electromagnetic (EM DC) casting is a modification of the conventional DC casting process in which electromagnetic forces are employed to control the shape of the molten metal as it solidifies rather than the bore of the conventional, tubular shaped DC casting mold. In most respects EM DC casting is essentially the same as conventional DC casting, except that there are no chill surfaces in the EM DC casting process to initiate solidification. Essentially all of the cooling for solidification is effected by the application of coolant onto the surface of the metal as it emerges from the discharge end of the EM casting assembly. For further information on EM DC casting, see U.S. Pat. Nos. 2,686,864 (Wroughton et al), 3,605,865 (Getselev), 3,646,988 (Getselev), 3,985,179 (Goodrich et al) and 4,004,631 (Goodrich et al).

Both conventional DC and EM DC casting have various coolant flow requirements for efficient and effective casting depending upon, among others, the size and shape of the ingot or billet, the alloy composition and the surface characteristics of the ingot or billet emerging from the mold. Additionally, coolant flow requirements at the start of a cast may be considerably different than those for the remainder of the cast. Even during casting, the coolant requirements may change due to changes in the casting rate or surface characteristics of the ingot or billet.

Various techniques have been used over the years to control the application of coolant on the surface of the ingot or billet emerging from the discharge end of the DC casting mold. In U.S. Pat. Nos. 2,791,812 air jets are directed into the coolant stream to atomize the liquid coolant before it contacts the mwetal surface to thereby prevent liquid coolant from flowing on the ingot or billet surface. In U.S. Pat. No. 3,713,479 coolant flow is reduced at the discharge end of the mold to retard the solidification rate and then a second coolant stream is applied at some distance away from the discharge end of the mold to compete solidification. As shown in FIG. 3 of this reference, the coolant flow to the ingot or billet surface is reduced by directing the coolant stream parallel to the ingot or billet surface then periodically pulsing a fluid such as water or air onto the curtain of coolant to change the direction thereof onto the ingot or billet surface. In U.S. Pat. Nos. 3,623,536 liquid coolant applied to the surface of the metal causes air to be aspirated and mixed with the liquid coolant to retard its cooling properties. In U.S. Pat. No. 3,765,493 the coolant applied to the metal surface at the start of casting is pulsed to retard the cooling effects of the liquid coolant to prevent the cracking characteristic of some aluminum alloys. In German Pat. No. 932,085 a DC casting mold is described in which the coolant flowing on the back side of the mold, parallel to the metal flow, is combined with the coolant from a second coolant stream so that the combined streams can then be applied to the cast metal surface. L. G. Berezin et al in Tsvetnye Metally, 1974, No. 4, pages 56–7, describe the use of three separate coolant application zones in EM DC casting in order to cast thick ingots. While many of these ideas have merit they have not been widely used in commercial DC casting processes.

The start-up of EM DC casting has been characterized by unique problems in that icicle-type appendages are formed on the butt end of the ingot or billet due to the inability of the magnetic forces and the bottom block to completely contain molten metal during the initial start-up period. Small molten metal streams flow over the butt end and solidify, thus forming the icicle-like appendages. These icicle formations require an excessive amount of the butt to be cropped off before further processing can beconducted on the ingot or billet, which adds considerably to the cost of EM DC casting and also severely limits its use.

It is against this background that the present invention was developed.

DESCRIPTION OF THE INVENTION

The invention generally relates to the EM DC casting of light metal products such as aluminum and aluminum alloys and is particularly directed to an improved method of applying coolant onto the surface of an EM DC cast product as it emerges from the discharge end of the inductor.

In accordance with the invention a first fluid stream of coolant is directed toward the surface of the solidified or partially solidified metal emerging from the discharge end of the inductor and a second fluid stream, preferably coolant is directed at the metal surface so that both streams converge at a point a short distance away from the surface of the emerging metal. The coolant flow of the first stream is in the general direction of metal movement and is at an angle from about 5° to 40° from the metal surface. The second fluid stream is directed toward the metal surface with the angle of convergence between the first and second coolant stream ranging from about 30° to 80°.

By varying the volume and/or velocity of one or both coolant streams the point of coolant impact on the surface of the metal discharging from the mold can be controlled and as a result variations in the cooling rate and thus the solidification plane can be effected. For example, by controlling the point of coolant impact on the metal surface closer to the discharge end of the mold assembly, increased cooling rates can be obtained, whereas by controlling the point of coolant impact on the metal surface farther away from the discharge end of the mold the cooling rates can be decreased. The turbulence generated by the confluence of the two coolant streams absorbs much of the energy of the two coolant streams so that the combined coolant stream will adhere to the surface of the ingot or billet even though the angle of impingement of the combined streams is much greater than the maximum angle possible with a single coolant stream. Although coolant (usually water) is the preferred fluid for the second stream gases, such as air, and other liquids can be utilized.

This method of coolant application provides a new dimension for controlling the EM DC casting process, because it allows for control procedures which prevent the formation of icicle-like appendages on the butt end of the EM DC cast ingot or billet. For example, the velocity and/or volume of the second fluid stream can be increased at the start of the cast so that the point of impact on the metal surface by the combined streams is as close as possible to the discharge end of the electromagnetic inductor. The resultant increasing cooling immediately beneath the inductor at the start of the cast prevents molten metal from flowing over the solidifying ingot or billet butt which forms the icicle-like appendages previously referred to. Additionally, because much of the energy is absorbed by the turbulence of the two streams there is no tendency for the combined streams to deform the surface of the metal at the start of the cast. As the bottom block is withdrawn from the discharge end of the inductor and the likelihood of icicle-like appendage formation is slight, the velocity and/or volume of the second stream can then be reduced so that the combined fluid stream impinges on the ingot or billet farther away from the discharge end of the inductor. Alternately, if desired, the velocity and/or volume of the first coolant stream can be increased so that the point of coolant impact is farther aaway from the discharge end of the inductor. If the coolant requirements change during casting, the volume and/or velocity of one or both of the streams can be adjusted to develop the desired solidification front.

Reference is made to the attached drawings which illustrate various embodiments of the invention.

Figure 1:
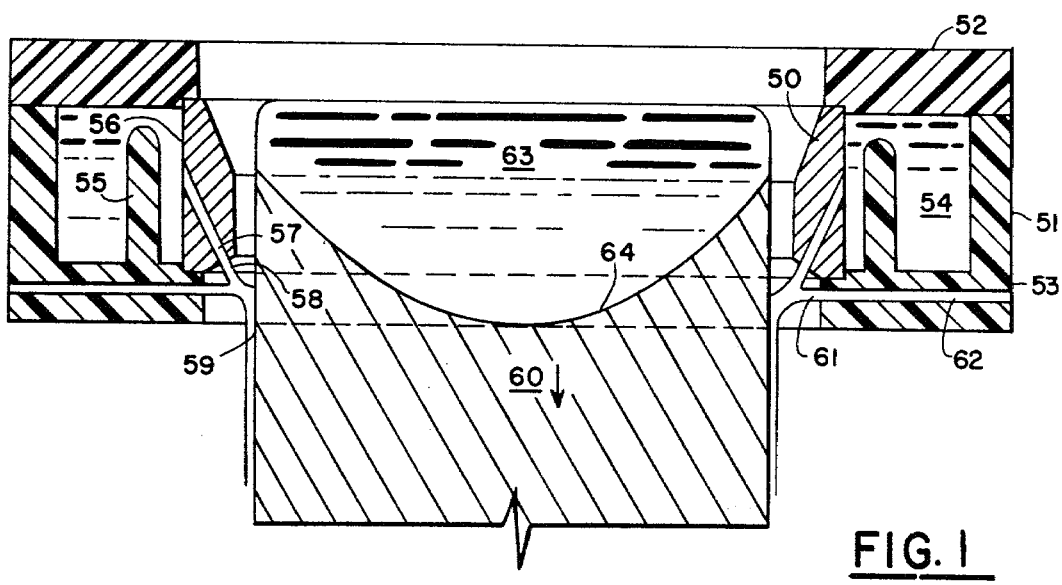
FIG. 1 is a schematic, cross sectional view of an EM DC casting mold assembly.

In FIG. 1 an electromagnetic casting assembly is shown which comprises an electromagnetic inductor 50 surrounded by water jacket 51. Members 52 and 53 of water jacket 51 together with inductor 50 form a coolant chamber 54. A baffle 55 is disposed within the chamber 54 to direct coolant along the back surface 56 of inductor 50 and out the conduits 57 provided in the lower portion of inductor 50. This first coolant stream 58 is directed toward the surface 59 of solidified or partially solidified ingot or billet 60 which emerges from the discharge end of the assembly. A second coolant stream 61 is directed from a source not shown through conduit 62 in member 53 toward the surface 59 so that it intersects with coolant stream 58 before contacting surface 59 of ingot or billet 60. As indicated in the drawing, there is no contact between the body of molten metal 63 and the inductor 50 because the molten metal is shaped by means of electromagnetic forces. It is preferred to have separate coolant sources for the first and second coolant streams so that both streams can be independently controlled. In the operation of the inductor, molten metal is continuously introduced into the inductor 50 where it is solidified or partially solidified in the manner shown schematically in the drawing. The solidification front is shown ideally at 64. The relatively high frequency current (e.g. 500–15000 Hz) utilized in the inductor will heat up any metallic members in the immediate vicinity of the inductor and can result in large energy losses. Therefore, it is preferred to have members 52 and 53 formed from non-metallic materials.

Figure 2:
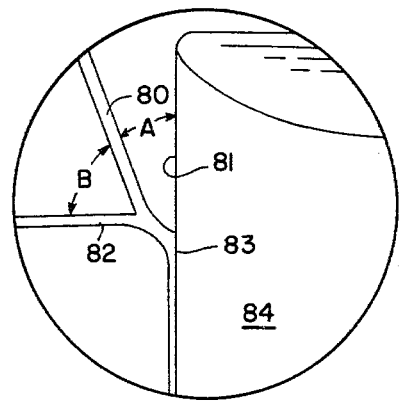
FIG. 2 is a schematic drawing which illustrates the angles of the coolant streams with respect to the cast metal surface.

FIG. 2 illustrates the relative directions of the first and second coolant streams with respect to the billet or ingot surface and to each other. In accordance with the invention angle A between the first stream 80 and the ingot or billet surface 81 ranges from about 5° to 40°, preferably about 5° to 30°. The intercept or convergence angle B between the first coolant stream 81 and second coolant stream 82 ranges from about 20° to 95°, preferably about 30° to 60°. It is preferrred to maintain the second coolant stream 82 approximately perpendicular with surface 81 for greater flexibility in controlling the point of impact 83 of the confluent streams onto the surface of ingot or billet 84. When the sum of angles A and B exceeds 125° there is usually an excessive amount of splashing coolant on the metal surface which can detrimentally affect the process.

Figure 3:
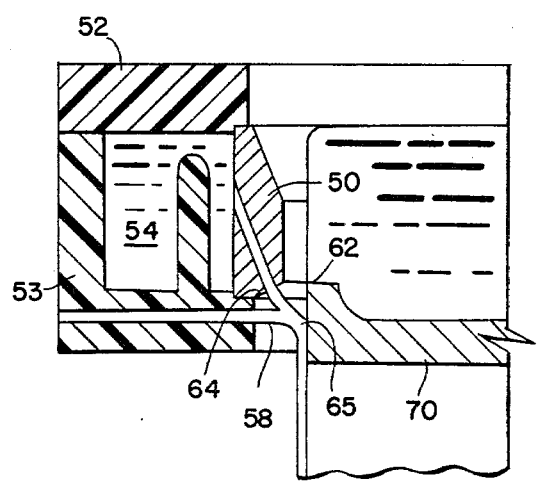
FIGS. 3 and 4 are partial cross sectional views of the EM DC casting assembly shown in FIG. 1 and illustrate the application of coolant at different points on the EM DC cast metal.
Figure 4:
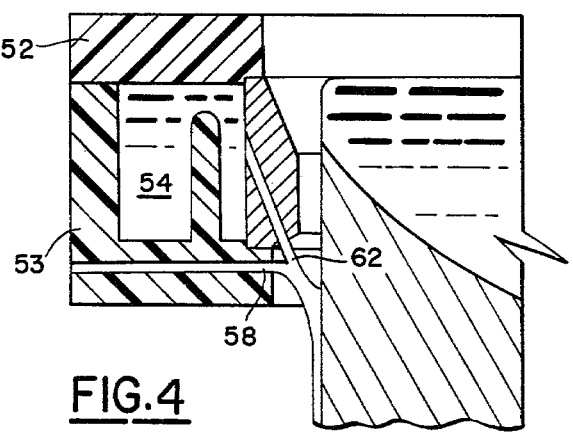

FIGS. 3 and 4 are partial cross sectional views of the EM DC casting assembly illustrated in FIG. 1 and are similarly numbered. FIG. 3 represents start-up of the cast and as shown a bottom block 90 is positioned within the inductor 50 at the discharge end thereof. The shape and dimensions of the molten metal introduced into the mold assembly are controlled by the bottom block 70 and the electromagnetic forces generated by the inductor 50. The solidification is effected by the combination of coolant streams 58 and 62 into coolant stream 65 which is directed as close as possible to the lower end 64 of the inductor 50. This control of the molten metal is effective in preventing the icicle-type appendages characteristic of EM DC casting during start-up. FIG. 4 represents the normal casting operation which has different cooling requirements than during the start-up of casting. In normal operation the volume and/or velocity of the second coolant stream 58 is reduced so that the combined coolant stream 65 impacts on the ingot or billet surface 59 farther away from the lower end 64 of inductor 50 than as shown in FIG. 3.

Although in the drawings the conduits for coolant discharge onto the ingot or billet are illustrated as a series of holes or apertures, it is recognized that a singular annular slot or a plurality of slots may be employed for the same purpose. Moreover, a deflector surface may be used to change the direction of the coolant stream to the desired inclination.

In practice it is frequently quite difficult to accurately measure the angle between the first curtain of coolant spray and the metal surface or between the two curtains of coolant spray because once a coolant stream leaves the direction determining conduit or surface it tends to expand, thus making measurement difficult. It is recommended the angle measurement be made on the direction determining conduit or surface when there is any question regarding same.

The following example is provided to further illustrate the invention. A 19"×45" (48.3×114.3 cm) aluminum ingot (5182 alloy) was cast utilizing an EM DC casting assembly similar to that shown schematically in FIG. 2. Molten aluminum was introduced into the EM DC assembly at a temperature of about 1320° F. (716° C). At the start of the cast when the bottom block was within the lower section of the inductor the first coolant stream was directed toward the surface of the ingot at an angle of 25° with a coolant flow of 75 gal per minute (284 L/min), and the second coolant stream was directed at the ingot surface at angle of convergence of about 65° with a coolant flow of 75 gal per minute. After the bottom block had passed the impact area of the combined second coolant stream and there was little chance for icicle-like appendage formation, the flow of coolant in the second coolant stream was gradually reduced to about 50 gal per minute (190 L/min) for normal casting operation and was maintained at this level until the end of the cast. At the start of the cast the point of coolant impact was about 0.25 inch (0.64 cm) beneath the inductor and after the flow of the second coolant stream was reduced to 50 gal per minute (190 L/min), the point of cooling impact was about 1 inch (2.5 cm) below the inductor. The drop rate (casting rate) was about 2.5 inches (6.3 cm) per minute. The surfaces of the ingot were excellent and essentially no icicle-like appendages formed on the butt end of the ingot.

It is readily apparent that various changes and modifications can be made to the embodiments described herein without departing from the teachings of the invention and the scope of the appended claims. For example, the invention has been primarily described herein in terms of a molding surface or means which cast products with circular cross sections, whereas, it is obvious that the molding means can be designed ot produce products having essentially any desired shape, e,g. square, rectangle, oval, and the like.

I claim:

1. In the method of continuous or semicontinuous casting of light metal products wherein molten metal is introduced into the feed end of an annular electromagnetic inductor, wherein the shape of the molten metal is controlled as it solidifies or partially solidifies in the inductor by means of forces generatexd by an electromagnetic field and wherein coolant is applied to the surface of the solidified or partially solidified metal which emerges from the discharge end of said electromagnetic inductor, the improvement comprising:
   (a) directing a first stream of liquid coolant around the periphery of the emerging metal at an angle of about 5° to 40° from the inductor axis and in the direction away from the discharge end of the electromagnetic inductor;
   (b) directing a second stream of fluid around the periphery of the emerging metal at an angle between about 20° and 95° from the first stream so that both first and second streams converge to form a confluent stream at a position disposed a short distance away from the emerging metal surface and the confluent stream then contacts the metal surface at a desired location depending upon the volume and velocity of the two streams, with the sum of the angle between the first stream and the inductor axis and the angle between the first and the second stream not exceeding 125°; and
   (c) controlling the volume or velocity or both the volume and velocity of the second fluid stream at elevated levels at the start of casting in order to direct the confluent coolant stream to an impact area on the emerging metal which is as close as possible to the discharge end of the electromagnetic inductor and when the butt of the ingot or billet passes the area of coolant impact, decreasing the volume or velocity or both the volume and velocity of the second fluid stream so that the area of coolant impact on the ingot or billet is moved farther away from the discharge end of the inductor than at the start of casting.

* * * * *